Aug. 11, 1959 R. A. NORDQUIST ET AL 2,898,685
SET UP GAUGE
Filed July 2, 1956
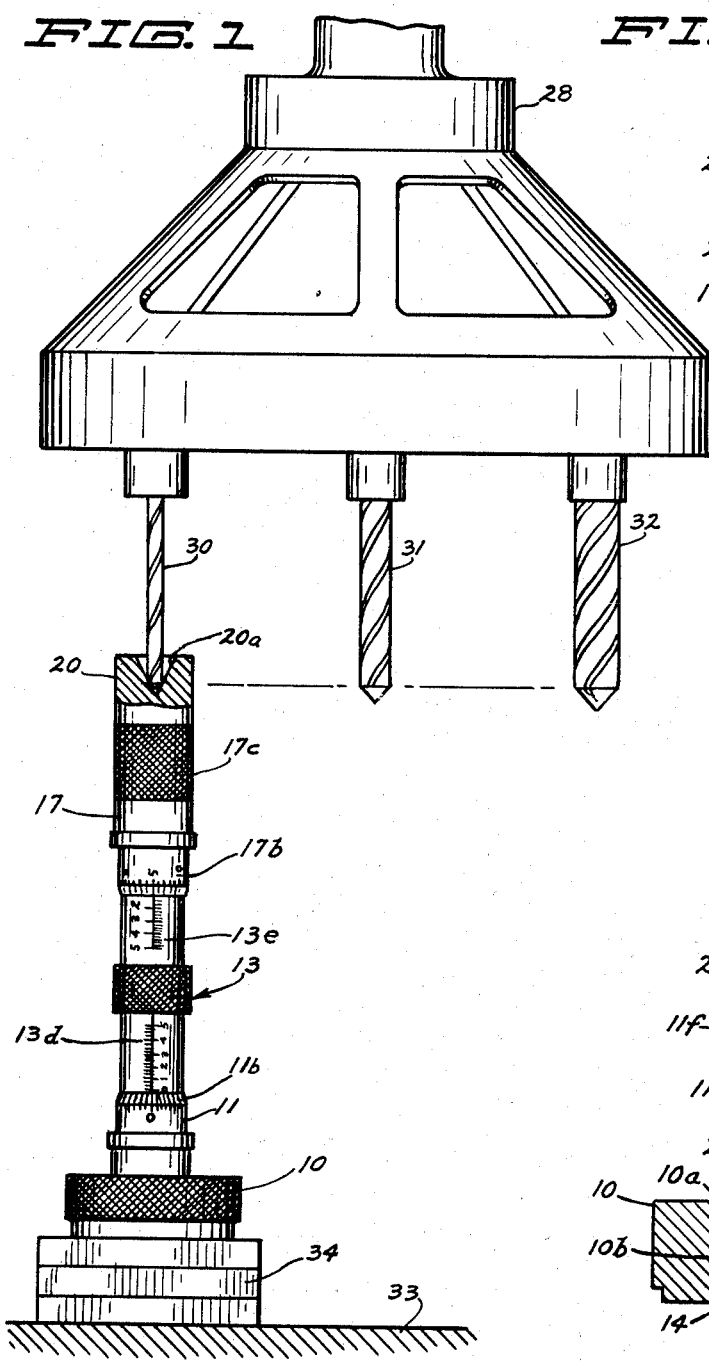
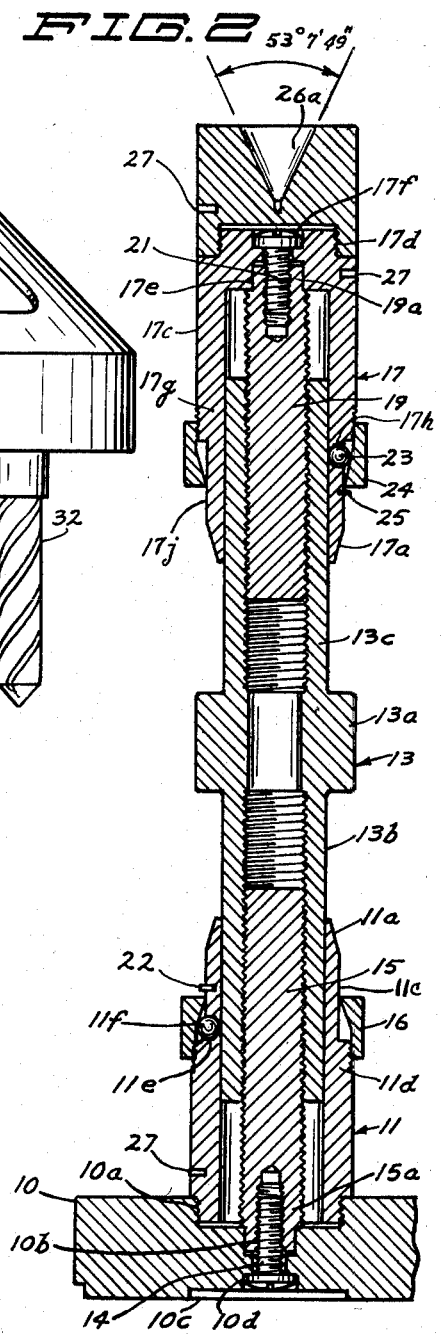
INVENTOR.
JAMES R. BUKOSKY
BY HOWARD W. LINDGREN
ROBERT C. MILLER
RICHARD A. NORDQUIST
ATTORNEYS

United States Patent Office 2,898,685
Patented Aug. 11, 1959

2,898,685
SET UP GAUGE

Richard A. Nordquist, Robert C. Miller, and James R. Bukosky, Minneapolis, and Howard W. Lindgren, St. Paul, Minn., assignors to Penta Incorporated, Minneapolis, Minn., a corporation of Minnesota Application July 2, 1956, Serial No. 595,337

8 Claims. (Cl. 33—170)

This invention relates to a set up gauge and while it is applicable for use with many types of cutting or boring tools, in the embodiment of the invention here illustrated and described, particular reference is made to the use of said gauge in connection with drills. Difficulty is experienced in accurately setting a drill quickly to cut an exact desired depth. A trial and error process is generally used which is time consuming, not efficient and not accurate. The drill point itself adds to the difficulty of accurately setting a drill as said point is frequently sharpened and is of no specific depth or distance from its point to the first point of maximum cutting width of said drill. It is particularly desirable also to have a quick and efficient means for setting drills in a multiple drill head where said drills may be of different sized diameters to bring said drills into a desired relation one with another to have the same or specifically different cutting depths.

It is an object of this invention to provide a device for quickly and accurately setting a boring tool such as a drill for a desired cutting depth from its first point of maximum cutting width.

It is another object of this invention to provide a device comprising a gauge adapted to accurately set drills of different diameters for cutting the same depth.

It is another object of this invention to provide a device comprising a gauge for use with a multiple drill head having a plurality of drills therein of different sized diameters to bring said drills into alignment in a common plane at the first point of their maximum cutting width and to set said drills to cut at the same or different depths in a specific desired relation one with another.

It is a further object of this invention to provide a device comprising a gauge having a portion having a recess with inclined sides such as a conical recess therein and having a scale thereon calibrated to the width of said recess at different points.

It is a more specific object of this invention to provide a device comprising a gauge having a member having a conical recess therein, a second member, said first member being movably connecting said first and second members and a scale on said second member calibrated to the width of said recess at different points.

It is a still more specific object of this invention to provide a device comprising a gauge having a base member having an upstanding sleeve, a screw axially disposed in said sleeve and secured to the inner end thereof, a member having oppositely extending internally threaded barrel portions, one of said barrel portions being movable into said sleeve and adapted to have threaded thereinto the other end of said screw, a member having a sleeve adapted to receive therein the other of said barrel portions, a screw axially disposed in said last mentioned sleeve and having one end secured therein and having its other end threaded into said last mentioned barrel portion, said last mentioned member having a portion upstanding therefrom having a conical recess therein and co-operating scales on said last mentioned barrel portion and sleeve calibrated to the width of said recess at different points.

These and other objects and advantages of the invention will be fully set forth in the following description made in connection with the accompanying drawings in which like reference characters refer to similar parts throughout the several views and in which:

Fig. 1 is a view in front elevation with a portion in section showing applicant's device in an operating position in connection with a partial view in front elevation of a multiple drill head; and Fig. 2 is a view of applicant's device in central vertical section on an enlraged scale.

Referring to the drawings, applicant's device comprising a set up gauge is shown having a base 10. In the embodiment of applicant's device as here illustrated, said base 10 is cylindrical in form having a knurled outer surface and a lower portion of small width and of reduced diameter. Said base 10 has an internally threaded central bore 10a having a counterbore 10b therein. Upstanding from said base 10 is a thimble 11 having its lower end portion threaded into said bore 10a. The upper edge portion 11a of said thimble 11 is beveled and carries thereon a scale 11b. Said scale as here illustrated is graduated into twenty-five parts whereby said complete scale conforms to the pitch of a micrometer screw to be described and represents one revolution of said screw.

As here illustrated, said thimble 11 has an upper portion 11c of reduced diameter having a threaded shoulder 11d formed adjacent thereto. A plurality of apertures 11e are formed adjacent said shoulder and adapted to be seated in each of said apertures are members 11f here shown to be spherical in form. Threaded onto said shoulder 11d is a lock nut 16 and a pin 22 to retain said lock nut is secured in said sleeve 11 adjacent said nut to provide movement of said nut but to prevent it from becoming entirely disengaged from said sleeve.

A barrel assembly 13 is provided having a central portion 13a shown here to be enlarged, cylindrical in form and having a knurled outer surface. Extending oppositely from each end of said central portion 13a are barrels 13b and 13c of some length and are here illustrated as being internally threaded. Said barrel 13b is of a size to slidingly fit into said thimble 11.

Axially disposed in said thimble 11 is a micrometer screw or measuring screw 15. Said screw in the embodiment of the invention as here illustrated is threaded to have the equivalent of forty threads per inch, with each revolution of said screw being equivalent to said scale 11b. The lower end 15a of said screw 15 shown here to be somewhat reduced in diameter is positioned in said counterbore 10b of said base 10. Said screw 15 is tapped axially at its lower end portion 15a. Said base 10 has a recessed portion 10c at its bottom having a counterbore 10d to receive the head of a self-locking screw 14. Said base is drilled to permit said screw to be threaded into said micrometer screw 15 to hold the same locked in position. Said screw 14 is adapted to allow adjustment of said micrometer screw 15. Thus said base 10, screw 15 and thimble 17 operate as an integral unit. Said screw 15 will be threaded into said barrel 13b. Carried on said barrel 13b is a scale 13d. Said scale as here shown is the equivalent of one-half of an inch of linear movement and will measure one-half inch of movement of said measuring screw 15 as it is rotated in barrel 13b and as indicated by the leading edge of thimble 11 moving over said scale. Each graduation on said scale is the equivalent of .025 inch. Hence each of said graduations represents one revolution of said measuring screw 15.

Adapted to slidingly fit over said barrel 13c is a thimble

17. Said thimble 17 has a beveled lower edge portion 17a on which is carried a scale 17b identical with said scale 11b. The upper end portion 17c of said thimble 17 has a knurled surface. Said portion 17c has a threaded outer end portion 17d of somewhat reduced diameter. Axially disposed in said thimble 17 is a micrometer screw or measuring screw 19 identical with said micrometer screw 15. Said micrometer screw 19 has its inner end portion 19a of reduced diameter positioned in the counterbore 17e of said thimble 17. Said screw 19 is axially tapped at its upper end portion 19a. Said thimble 17 has a recess 17f at its upper end to receive the head of a self-locking screw 21 and is bored to permit said screw to be threaded into said tapped portion of said micrometer screw 19. Thus said thimble 17 and screw 19 operate as an integral unit. Said measuring screw 19 is threaded into said barrel 13c.

Similar to the upper end structure of said thimble 11, said thimble 17 has a lower portion 17j of reduced diameter having a threaded shoulder 17g adjacent thereto, a plurality of apertures 17h are formed in said portion 17f adjacent said shoulder and respectively seated therein are locking members 23 here shown to be spherical in form. Threaded onto said shoulder 17g and overlying said members 23 is a lock nut 24. Secured in said thimble 17 adjacent said lock nut is a retaining pin 25.

Threaded onto said portion 17d of said thimble 17 and upstanding therefrom is a bushing 26. Said bushing is here shown to be cylindrical in form and having therein a recess 26a. Said recess may be variously formed and it may be formed to have various relationships formed between its width at various points and its depth. In the embodiment of the invention here illustrated said recess is shown to be conical in form and is represented to have formed therein an angle of 53°7'49". Said recess as here illustrated has a maximum width of one-half inch. The width at any point in said recess in a plane at right angles to the axis of said bushing is the same dimension as the right-angled distance from said plane to the apex of the angle formed by said recess.

Carried on said barrel 13c adjacent said central portion 13a is a scale 13e. Said scale in the embodiment here illustrated is calibrated to establish a relationship between the width of said recess at various points therein and the right-angled distance from the different planes of such widths to the apex of the angle formed by said recess. As indicated in the present embodiment, said widths at different points and the depth of said recess will be the same distance. Said scale 13e as here shown is identical to said scale 13d and a setting of said scale to correspond to any desired width of said recess will result in a linear movement of said bushing and the recess therein to correspond to said width from a zero reading point on said scale.

Thus said scales 13e and 17b will measure the distance moved by said bushing 26 to have said distance of movement correspond to the width at different points in said recess.

Said members 11, 17 and 26 are provided with recesses 27 shown here as a convenient holding means for a tool such as a spanner wrench to rotate and tighten said members.

Applicant's device with each of the scales thereon respectively set at their zero points will represent a known dimension in length.

With reference to Fig. 1, a partial view of a multiple drill head 28 is shown having mounted therein drills 30, 31 and 32. For purpose of illustration, said drills will be respectively designated as having diameters of one-eighth of an inch, one-fourth of an inch, and three-eighths of an inch. Said diameters measure the maximum cutting width of said drills. Applicants' device is illustrated as resting on a drill table 33 and being supported on gauge blocks 34.

In the embodiment of applicants' device as here illustrated, the first step in its operation will be to bring into alignment in a common plane at their first point of maximum cutting width said drills 30, 31, and 32. Said drill 30 will be lowered to rest in said recess 26a and will be locked in this position. The tips of said drills are disregarded entirely in this operation. At the first point of maximum cutting width said drill 30 will measure one-eighth of an inch. The plane of said width in said recess 26a will be one-eighth of an inch in distance from the apex of the angle formed by said recess. Portion 17c of thimble 17 will be rotated to bring its lower beveled edge to the point on said scale 13e where it will read .125. Said scale 17b is used to get an accurate reading of the third digit. This reading represents one-eighth of an inch in linear measurement.

In the next step of the operation drill 31 will be brought into alignment in the same plane as said drill 30 by setting up applicants' device thereunder, resting said drill in said recess and setting scale 13e and 17b to coincide with the diameter of said drill which is here indicated to be one-fourth inch. In the event it is desired to have said drill 31 cut to lesser or greater depth than said drill 30 its setting may be further modified by use of scales 13d and 11b. Said scales may be supplemented by use of gauge blocks 34. Said drill 31 will then be locked in its desired position. In like manner the remaining drills in said multiple drill head will be set.

It is now seen that said drills have been set in a desired relation with each other. Applicants' device may now be set up under any one of the drills of said multiple drill head or it may remain under the last drill set up and by means of said scales 13d and 11b and by the use of gauge blocks if necessary, a desired overall depth of cut may be established. The device itself as has been indicated represents a known dimension which is taken into consideration in calculating depth of cut. With the depth of cut having been established for one of the drills, each of the other drills will cut to a greater or lesser depth according to the specific relation established between each of the drills as set forth in the above steps.

Said over all cutting depth is established from the plane in which said drills have been brought into alignment at their first points of maximum cutting width.

Thus it is seen that we have provided a simple and efficient depth setting gauge, for quickly and accurately setting individual drills or as here illustrated a plurality of drills in a multiple drill head setting said drills in a specific relation with each other. Said drills are first brought into alignment in a common plane at their points of maximum cutting width and at the same time the desired relation of one with another may be established and finally at the point of any drill the over all cutting depth is quickly set up from said plane of alignment. Applicants' device is simply constructed and easily operated to accurately and quickly perform the function of setting up drills for desired cutting depths.

It will of course be understood that various changes may be made in the form, details, arrangement and proportions of the parts, without departing from the scope of applicants' invention, which, generally stated, consists in a device capable of carrying out the objects above set forth, in the parts and combinations of parts disclosed and defined in the appended claims.

What is claimed is:

1. A gauge of the type described having in combination, a member having an internally threaded barrel upstanding therefrom, a second member having at one end portion an axial bore adapted to receive therein a portion of said barrel, a screw integral with said second member and adapted to be threaded into said barrel for movably connecting said second member and said barrel, said second member having at its other end portion a conical recess, and a scale on said barrel having graduations which are in proportion to the width of said recess at different points whereby said second member can be moved axially to position any given point of the width of said recess as desired.

2. The structure set forth in claim 1, a base member supporting said first member and means associated with said base member and said first member for moving said first member axially of said base member.

3. A gauge of the type described having in combination, a base member, a sleeve upstanding therefrom, a screw axially disposed in said sleeve and having one end secured to said base, a member having oppositely extending barrel portions, said portions being internally threaded, one of said barrel portions being movable into said sleeve and adapted to have threaded thereinto the other end portion of said screw whereby said barrel is movable axially of said sleeve, a member having a sleeve adapted to receive herein the other of said barrel portions, a screw axially disposed in said last mentioned sleeve and having one end secured therein and having its other end threaded into said last-mentioned barrel portion for movably connecting said last-mentioned sleeve and said last-mentioned barrel, said last-mentioned member having a portion upstanding therefrom having a conical recess therein, and co-operating scales respectively on said last-mentioned sleeve and said last-mentioned barrel portion having graduations which are in proportion to the width of said recess at different points for determining the relative axial movement of said last-mentioned sleeve and barrel.

4. A gauge of the type described having in combination, a member having a recess therein with said recess having inclined sides, a base portion supporting said member and serving as a reference point, means associated with said base portion and said member for axially moving said member, and a linear scale associated with said member having graduations which are in proportion to the width of said recess at different points therein, said proportion being the cotangent of one-half of the apex angle whereby said member is moved to position a certain width of said recess at a certain point axially of said base member.

5. A gauge of the type described having in combination, a member having a conical recess therein forming an apex angle, means operatively associated with said member for vertical movement thereof, a linear scale carried by said means, said scale having graduations in proportion to the width of said recess at different points therein and said proportions being the cotangent of one-half of said apex angle.

6. A gauge of the type described having in combination, a member having a recess therein with said recess having inclined sides forming an apex angle, a base portion, means movably connecting said member and said base portion for axial movement of said member, a linear scale associated with said means, said scale having graduations which are in proportion to the width of said recess at different points therein and said proportion being the cotangent of one-half of said apex angle whereby said member is moved in accordance with said scale to axially position a desired width of said recess at a desired point.

7. A gauge of the type described having in combination, an upstanding member having an upper end portion having a recess having inclined sides forming an apex angle, a base portion, means movably connecting said member and said base portion for axial movement of said member, a linear scale associated with said means, said scale having graduations, the width of said recess at different points therein being in proportion to said graduations and said proportion being the tangent of one-half of said apex angle.

8. A gauge of the type described having in combination, a member having a conical recess therein forming an apex angle, means operatively associated with said member for vertical movement thereof, a linear scale carried by said means, said scale having graduations, the width of said recess at different points therein being in proportion to said graduations and said proportion being the tangent of one-half of the apex angle.

References Cited in the file of this patent

UNITED STATES PATENTS

| 1,416,810 | Foster | May 23, 1922 |
| 1,797,122 | Bohn | Mar. 17, 1931 |
| 2,758,383 | Breit | Aug. 14, 1956 |

FOREIGN PATENTS

| 535,110 | Germany | Oct. 6, 1931 |